United States Patent
Karlo et al.

(10) Patent No.: US 10,254,871 B2
(45) Date of Patent: Apr. 9, 2019

(54) USING PRESSURE SENSOR INPUT TO SELECTIVELY ROUTE USER INPUTS

(71) Applicant: Google Inc., Mountain View, CA (US)

(72) Inventors: Thomas Ramon Karlo, San Francisco, CA (US); Isaac Reynolds, Mountain View, CA (US); Kishore Sundara-Rajan, Redwood City, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/483,577

(22) Filed: Apr. 10, 2017

(65) Prior Publication Data

US 2018/0292938 A1    Oct. 11, 2018

(51) Int. Cl.
  *G06F 3/041*    (2006.01)
  *G06F 3/0488*   (2013.01)
  *G06F 1/16*     (2006.01)

(52) U.S. Cl.
  CPC .......... *G06F 3/0414* (2013.01); *G06F 1/1626* (2013.01); *G06F 3/04883* (2013.01); *G06F 2200/1636* (2013.01)

(58) Field of Classification Search
  CPC .... G06F 3/0414; G06F 3/04883; G06F 3/041; G06F 2203/04105; G06F 2203/04103; G06F 1/1626; G06F 2200/1636
  See application file for complete search history.

(56) References Cited

U.S. PATENT DOCUMENTS 6,498,601 B1    12/2002  Gujar et al.
2011/0273378 A1*  11/2011  Alameh ............ H04M 1/72569
                                                    345/173
(Continued)

FOREIGN PATENT DOCUMENTS

CN    101853133 A    10/2010
TW    201333768 A1    8/2013
(Continued)

OTHER PUBLICATIONS

Scott et al., "Mobile Device Interaction with Force Sensing," Microsoft Research, Cambridge, UK, May 1, 2009, 18 pp.
(Continued)

*Primary Examiner* — Tom V Sheng
(74) *Attorney, Agent, or Firm* — Shumaker & Sieffert, P.A.

(57) ABSTRACT

In general, this disclosure describes techniques for routing user inputs to an operating system or an application based on other inputs received at pressure sensors. In one example, computing device receives an indication of a first user input that is detected by pressure sensors of the computing device. The pressure sensors are positioned along two or more sides of a housing of the computing device. The computing device also receives an indication of a second user input, detected by a presence-sensitive display of the computing device. The computing device determines, based on the first user input, whether the second user input is associated with an application or an operating system executing at the computing device. Responsive to determining that the second user input is associated with the operating system, the computing device performs a system-level action.

20 Claims, 4 Drawing Sheets

(56) References Cited

U.S. PATENT DOCUMENTS

| | | | |
|---|---|---|---|
| 2012/0088553 A1* | 4/2012 | Nunes | G06F 1/1626 455/566 |
| 2012/0212421 A1 | 8/2012 | Honji | |
| 2012/0262396 A1* | 10/2012 | Jiyama | G06F 3/0414 345/173 |
| 2013/0187855 A1 | 7/2013 | Radakovitz et al. | |
| 2014/0317722 A1 | 10/2014 | Tartz et al. | |
| 2015/0185944 A1* | 7/2015 | Magi | G06F 1/1652 345/174 |
| 2016/0077627 A1 | 3/2016 | Vecera et al. | |

FOREIGN PATENT DOCUMENTS

| | | | |
|---|---|---|---|
| TW | 201712486 A | 4/2017 | |
| WO | 2015112405 A1 | 7/2015 | |

OTHER PUBLICATIONS

International Search Report and Written Opinion from International Application No. PCT/US2018/021433, dated Jul. 11, 2018, 14 pp.
Examination & Search Report, and translation thereof, from counterpart Taiwanese Application No. 107108584, dated Dec. 10, 2018, 17 pp.

\* cited by examiner

USING PRESSURE SENSOR INPUT TO SELECTIVELY ROUTE USER INPUTS

BACKGROUND

A user may interact with applications that are executing on a computing device (e.g., a mobile phone, tablet computer, smartphone, desktop computer, or similar device). In some examples, a computing device may include a presence-sensitive screen that may enable a user to interact with the computing device. The user may touch or otherwise provide, via the presence-sensitive screen, input to the computing device. Typically, the computing device processes the input and performs an action based on the application and the input.

SUMMARY

Techniques of this disclosure may enable a computing device to process user inputs directed to an operating system executing at the computing device, or alternatively, to an application executing at the computing device, based on one or more other user inputs detected by pressure sensors of the computing device. In some examples, a housing of the computing device may include pressure sensors. In such embodiments, if a user squeezes or twists the computing device in such a way that at least a portion of the pressure sensors detect an increase or a change in pressure resulting from the squeeze or twist, a processor of the computing device may, in response, provide, to an operating system executing at the computing device, an indication of other user input detected at a presence-sensitive display communicatively coupled to the processor. Otherwise, if the pressure sensors do not detect the increased pressure, the processor may provide the indication of other user input to a currently executing application (rather than to the operating system). In this way, a user may easily be able to switch between providing application-level inputs and system-level inputs by squeezing or twisting the computing device. By utilizing the squeezing and/or twisting gesture as the determinant for the input being application-level or system-level, the computing device may require fewer overall inputs before performing application-level and system-level actions, thereby increasing the battery efficiency and processing speed of the computing device.

In one example, a method includes receiving, by one or more processors of a computing device, an indication of a first user input that is detected by one or more pressure sensors of the computing device. In the example, the pressure sensors are positioned along two or more side of a housing of the computing device. The method also includes receiving, by the one or more processors, an indication of a second user input, wherein the second user input is detected by a presence-sensitive display of the computing device. The method further includes determining, by the one or more processors, based on the indication of the first user input, whether the second user input is associated with an application executing at the computing device or an operating system executing at the computing device. The method also includes, responsive to determining that the second user input is associated with the operating system, performing a system-level action.

In another example, a computing device includes a housing having a plurality of sides. The computing device further includes a plurality of pressure sensors, where respective portions of the plurality of pressure sensors are positioned on each side of at least two sides of the plurality of sides of the housing. The pressure sensors are configured to detect pressure-based input. The computing device also includes a presence-sensitive display, one or more processors, and a memory that stores an operating system, and a plurality of applications. The one or more processors are configured to execute the operating system and a first application from the plurality of applications. The one or more processors are further configured to receive, from one or more pressure sensors from the plurality of pressure sensors, an indication of a first user input. The one or more processors are also configured to determine, based on the indication of the first user input, a holding gesture indicative of a way a user of the computing device is holding the computing device. The one or more processors are further configured to, while the one or more pressure sensors continue to detect the first user input, receive, from the presence-sensitive display, an indication of a second user input, wherein the second user input is detected by the presence-sensitive display. The one or more processors are also configured to determine, based on the holding gesture, whether the second user input is associated with the operating system or the first application. The one or more processors are further configured to, in response to the at least one module determining the second user input is associated with the operating system, perform a system-level action.

In another example, a non-transitory computer-readable storage medium encoded with instructions that, when executed, cause one or more processors of a computing device to receive an indication of a first user input that is detected by one or more pressure sensors of the computing device, wherein the pressure sensors are positioned along two or more side of a housing of the computing device. The instructions further cause the one or more processors to receive an indication of a second user input, wherein the second user input is detected by a presence-sensitive display of the computing device. The instructions also cause the one or more processors to determine, based on the indication of the first user input, whether the second user input is associated with an application executing at the computing device or an operating system executing at the computing device. The instructions further cause the one or more processors to, responsive to determining that the second user input is associated with the operating system, perform a system-level action.

In another example, a computing device includes means for receiving an indication of a first user input that is detected by one or more pressure sensors of the computing device. The pressure sensors are positioned along two or more side of a housing of the computing device. The computing device also includes means for receiving an indication of a second user input, wherein the second user input is detected by a presence-sensitive display of the computing device. The computing device further includes means for determining, based on the indication of the first user input, whether the second user input is associated with an application executing at the computing device or to an operating system executing at the computing device. The computing device also includes means for, responsive to determining that the second user input is associated with the operating system, performing a system-level action.

The details of one or more embodiments are set forth in the accompanying drawings and the description below. Other features, objects, and advantages will be apparent from the description and drawings, and from the claims.

DETAILED DESCRIPTION

Figure 1:
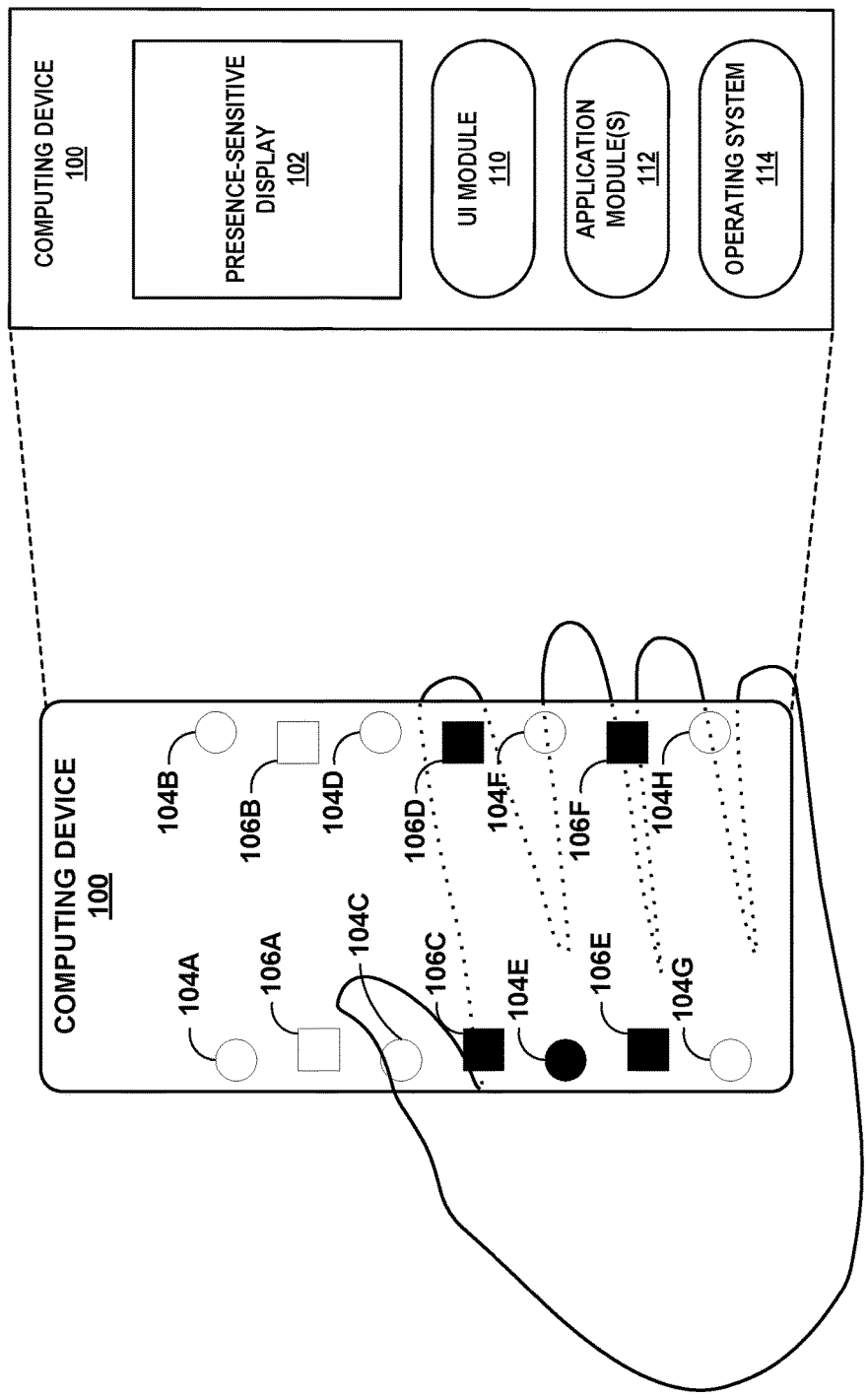
FIG. 1 is a conceptual diagram illustrating an example of a computing device that uses inputs detected by pressure sensors to route indications of user inputs to an application or an operating system executing at the computing device, in accordance with one or more aspects of the present disclosure.

FIG. 1 is a conceptual diagram illustrating an example of computing device 100 that uses inputs detected by pressure sensors to route indications of user inputs to an application or an operating system executing at the computing device, in accordance with one or more aspects of the present disclosure. Computing device 100 may be a stand-alone device, or may be part of a larger system. In some examples, computing device 100 may be a mobile device. Examples of computing device 100 include portable or mobile devices, such as mobile phones, tablet computers, smartphones, personal digital assistants (PDAs), portable gaming devices, portable media players, and e-book readers, as well as non-portable devices such as desktop computers. In the example of FIG. 1, computing device 1 may be a smartphone.

As shown in FIG. 1, computing device 100 includes presence-sensitive display 102, sensors 104A-104H (collectively, "sensors 104"), sensors 106A-106F (collectively, "sensors 106"), user interface (UI) module 110, one or more application modules 112 (hereinafter, "application module 112"), and operating system 114. In some instances, computing device 100 may communicate with external, distinct devices via one or more networks, such as one or more wired or wireless networks, which may, in some cases, provide access to the Internet.

As shown in FIG. 1, computing device 100 includes a presence-sensitive display 102. Presence-sensitive display 102 of computing device 100 may function as an input device for computing device 100 and as an output device. Presence-sensitive display 102 may be implemented using various technologies. For instance, presence-sensitive display 102 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Presence-sensitive display 102 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing device 100.

Presence-sensitive display 102 of computing device 100 may include a presence-sensitive display that may receive tactile input from a user of computing device 100. Presence-sensitive display 102 may receive indications of the tactile input by detecting one or more gestures from a user of computing device 100 (e.g., the user touching or pointing to one or more locations of presence-sensitive display 102 with a finger or a stylus pen). Presence-sensitive display 102 may present output to a user, for instance at a presence-sensitive display. Presence-sensitive display 102 may present the output as a graphical user interface (e.g., user interface 14), which may be associated with functionality provided by computing device 100. For example, presence-sensitive display 102 may present various user interfaces of components of a computing platform, operating system, applications, or services executing at or accessible by computing device 100 (e.g., an electronic message application, an Internet browser application, a mobile operating system, etc.). A user may interact with a respective user interface to cause computing device 100 to perform operations relating to a function.

Sensors 104 and 106 may detect touch inputs from a user. Sensors 104 and 106 may include electrical devices such as capacitive sensors or resistive sensors, or may include mechanical devices such as switches or pressure plates. In one example, sensors 104 and 106 may include a plurality of simple capacitance sensors able to determine a change in the capacitance of a material. Electrical hardware attached to each one of the simple capacitance sensors may monitor the respective simple capacitance sensors for a change in capacitance. A change in capacitance may be determined by the attached electrical hardware and an indication may be output by the pressure sensor. Other known sensor techniques providing the ability to sense touch input may also be employed to receive touch input from a user.

Sensors 104 and 106 may be touch or pressure sensors. Sensors 104 and 106 may be located in or on a housing of computing device 100. For example, one or more sensors 104 and 106 may be located such that, when a user interacts with computing device 100 (e.g., by holding computing device 100), sensors 104 and 106 detect touch or pressure inputs at certain ones of sensors 104 and 106. Sensors 104 and 106 may provide indications of the detected touch inputs to computing device 100, or more specifically to UI module 110.

Sensors 104 and sensors 106 may be located in different portions of the housing of computing device 100. For instance, one or more portions of presence-sensitive display 102 may overlap one or more sides of the housing of computing device 100. In such instances, sensors 104 may be located underneath presence-sensitive display 102 in the portions that overlap the one or more sides of the housing of computing device 100, and sensors 106 may be located in or on a portion of the housing that is not overlapped by presence-sensitive display 102. In other instances, sensors 104 may be located in a side portion of the housing of computing device 100, and sensors 106 may be located in a back portion of the housing of computing device 100. Other configurations could include any of sensors 104 and sensors 106 being located in a front portion of the housing of computing device 100, a bottom portion of the housing of computing device 100, a top portion of the housing of computing device 100, or any other location in or on the housing of computing device 100 where touch or pressure inputs may reasonably be sensed.

Throughout the disclosure, examples are provided where the sensors described (e.g., sensors 104 and 106) are additional sensors embedded in a housing of the computing device (e.g., computing device 100). This description is provided in order to more clearly describe the functions and techniques of the disclosure. However, in some examples, computing device 100 may not include sensors 104 and 106, and the functionality of sensors 104 and 106 may be included in presence-sensitive display 102. As such, determinations of a holding gesture, squeezing gestures, hold gestures, twisting gestures, or any other determinations made based on the data produced by sensors 104 and 106 may instead be based on data produced by presence-sensitive display 102. In other words, presence-sensitive display 102 may sense pressure and touch inputs, and UI module 110 may determine a holding gesture based on the data received from presence-sensitive display 102.

Computing device 100 may include application module 112 and UI module 110. Modules 110 and 112 may perform operations described using software, hardware, firmware, or a mixture of hardware, software, and firmware residing in and/or executing at computing device 100. Computing device 100 may execute modules 110 and 112 with one or more processors. Computing device 100 may execute modules 110 and 112 as a virtual machine executing on underlying hardware. Modules 110 and 112 may execute as a service or component of an operating system or computing platform. Modules 110 and 112 may execute as one or more executable programs at an application layer of a computing platform. Presence-sensitive display 102 and modules 110 and 112 may be otherwise arranged remotely to and remotely accessible to computing device 100, for instance, as one or more network services operating in a network cloud. In other words, modules 110 and 112 may not be executing at computing device 100. Instead, modules 110 and 112 may be executing at a remote computing system (e.g., a server).

Computing device 100 may include operating system 114. Operating system 114, in some examples, controls the operation of components of computing device 100. For example, operating system 114, in one example, facilitates the communication of UI module 110 and application module 112 with various run-time libraries and hardware components of computing device 100, including sensors 104, sensors 106, and presence-sensitive display 102. Operating system 114 may also perform various system operations or operations between multiple application modules 112. For instance, in response to receiving the requisite user input, operating system may perform a copy operation, a paste operation, a screenshot operation, identify an object at a location of the second user input, a minimize window operation, a swap windows operation, a terminate active application operation, or a swap active application operation.

UI module 110 may include hardware elements, software elements, or a combination thereof. UI module 110 may receive one or more touch inputs from sensors 104 and 106. Based upon the received touch inputs, UI module 210 may determine the way in which a user is holding computing device 100, otherwise known as a holding gesture. In one example, when holding computing device 100 tightly, a user may cause certain ones of sensors 104 and 106 to detect a sharp increase in the touch input. Sensors 104 and 106 may provide the detected touch inputs to UI module 110. UI module 110 may determine that the received touch inputs correspond to a squeeze gesture. In other examples, UI module 110 may determine that the received touch inputs correspond to a twisting gesture or a soft hold gesture.

UI module 110 may initially execute both operating system 114 and application module 112. For instance, while computing device 100 is powered on, UI module 110 may continually execute operating system 114 for performing a variety of system-level operations, even if a graphical user interface associated with operating system 114 is not being displayed on presence-sensitive display 102. Further, UI module 110 may also execute application module 112. For instance, UI module 110 may begin executing application module 112 after receiving an indication of user input selecting an application associated with application module 112. While executing application module 112, UI module 110 may output a graphical user interface for the application associated with application module 112 for display on presence-sensitive display 102. However, UI module 110 may continue executing operating system 114 even while executing application module 112 and outputting the graphical user interface for the application associated with application module 112 for display on presence-sensitive display 102.

In accordance with the techniques of this disclosure, UI module 110 of computing device 100 may receive an indication of a first user input detected by sensors 104 and/or sensors 106. For instance, as shown in FIG. 1, a user may be gripping computing device 100 such that the user's hand is applying some level of pressure to computing device 100 at locations corresponding to sensors 106C, 106D, 106E, 106F, and 104E. UI module 110 may receive an indication of the pressure detected by sensors 106C, 106D, 106E, 106F, and 104E, such as a current amplitude of the pressure or a change in the amplitude of the pressure resulting from the user applying a tighter or a looser grip to computing device 100. In some instances, the indication of the first user input may be the user gripping computing device 100 in the typical way that a user holds computing device 100, such as with a relatively constant amount of pressure applied to computing device 100. In other instances, the indication of the first user input may be a squeezing gesture or a twisting gesture, generally characterized by a sharp increase in the amount of pressure applied to computing device 100. An in-depth description of these gestures is shown below with respect to FIG. 2.

UI module 110 may further receive an indication of a second user input that is detected by presence-sensitive display 102 of computing device 100. For instance, presence-sensitive display 102, while outputting the graphical user interface for the application associated with application module 112 for display at presence-sensitive display 102, may detect an indication of a second user input, such as a tap input on presence-sensitive display 102 or a gesture on presence-sensitive display 102. UI module 110 may receive this indication of the second user input detected by presence-sensitive display 102.

UI module 110 may determine, based on the indication of the first user input, whether the second user input is associated with application module 112 executing at computing device 100 or operating system 114 executing at computing device 100. As noted above, although UI module 110 may be outputting a graphical user interface for the application associated with application module 112 for display at presence-sensitive display 102, UI module 110 may be executing both application module 112 and operating system 114. As such, based on the indication of first user input, UI module 110 may determine whether to provide the indication of the second user input to application module 112 or operating system 114. For instance, if the indication of the first user input shows that the user is only applying a normal amount of pressure that the user would typically apply when simply gripping computing device 100, UI module 110 may provide the indication of the second user input to application module 112. In another instance, if the indication of the first user input shows that the user applied a squeezing gesture to computing device 100 but an amount of time greater than a predetermined threshold amount of time has passed since the user released the squeezing gesture, UI module 110 may provide the indication of the second user input to application module 112. By providing the indication of the second user input to application module 112, application module 112 may execute an application-level operation, such as selecting an element within the graphical user interface, traversing a link, activation of an element within the graphical user interface, reposition a cursor within the graphical user interface, scroll through the graphical user interface, zoom in or out on the content of the graphical user interface, panning through content of the graphical user interface, turning a page within the application, or performing an application-level operation within the application associated with application module 112.

In other instances, UI module 110 may determine that the second user input is associated with operating system 114. For instance, UI module 110 may determine that the indication of the first user input is a squeezing gesture and that the user is still applying the squeezing gesture when UI module 110 receives the indication of the second user input. In such instances, UI module 110 may determine to provide the indication of the second user input to operating system 114. In still other instances, UI module 110 may determine that the indication of the first user input is the squeezing gesture, that the user has released the squeezing gesture, but that UI module 110 received the indication of the second user input within a predetermined time after the user released the squeezing on computing device 100. In such instances, UI module 110 may determine that the second user input is associated with operating system 114. Responsive to determining that the second user input is associated with operating system 114, UI module 110 may provide the indication of the second user input to operating system 114. By providing the indication of the second user input to operating system 114, operating system 114 may execute a system-level operation, such as a copy content operation, a paste content operation, a screenshot operation, identifying an object at a location of the second user input, minimizing a window shown in the graphical user interface, swapping windows within the graphical user interface, terminating an active application, swapping an active application operation, or performing a system-level operation using operating system 114.

In this manner, rather than entering a complicated sequence of inputs or attempting to simultaneously initiate multiple inputs, a user may easily be able to switch between providing application-level inputs and system-level inputs by squeezing or twisting computing device 100. By utilizing the squeezing and/or twisting gesture as the determinant for the input being application-level or system-level, computing device 100 may receive fewer overall inputs before performing application-level and system-level actions, thereby increasing the battery efficiency and processing speed of computing device 100.

Figure 2:
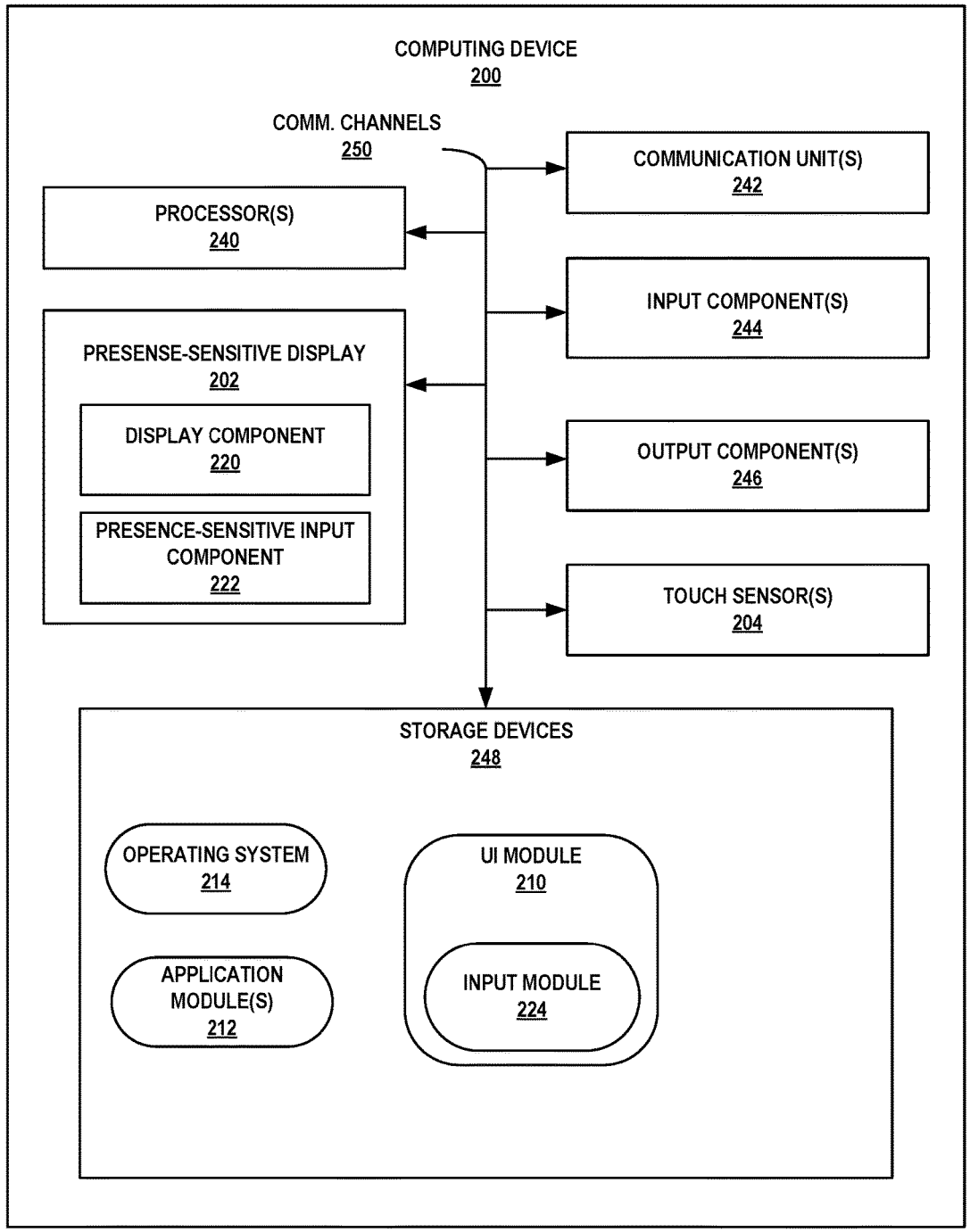
FIG. 2 is a block diagram illustrating further details of one example of the computing device shown in FIG. 1, in accordance with one or more aspects of the present disclosure.

FIG. 2 is a block diagram illustrating further details of one example of the computing device shown in FIG. 1, in accordance with one or more aspects of the present disclosure. FIG. 2 illustrates only one particular example of computing device 200, and many other example embodiments of computing device 200 may be used in other instances. As shown in the specific example of FIG. 2, computing device 200 includes presence-sensitive display 202, one or more processors 240, a plurality of pressure sensors 204, one or more communication units 242, one or more input components 244, one or more output components 246, network interface 26, one or more communication channels 250 (COMM. CHANNEL(S)), and one or more storage devices 248. Each of components 202, 240, 242, 244, 246, 248, and 204 may be interconnected (physically, communicatively, and/or operatively) for inter-component communications. In some examples, communication channels 250 may include a system bus, network connection, interprocess communication data structure, or any other channel for communicating data. As one example in FIG. 2, components 202, 240, 242, 244, 246, 248, and 204 may be coupled by one or more communication channels 250.

Computing device 200 can include additional components that, for clarity, are not shown in FIG. 2. For example, computing device 200 can include a battery to provide power to the components of computing device 200. Similarly, the components of computing device 200 shown in FIG. 2 may not be necessary in every example of computing device 200. For instance, computing device 200 may not, in all examples, include the additional output components 246.

One or more processors 240 may include, in certain examples, any one or more of a microprocessor, a controller, a digital signal processor (DSP), an application specific integrated circuit (ASIC), a field-programmable gate array (FPGA), or equivalent discrete or integrated logic circuitry. Processors 240 may be configured to implement functionality and/or process instructions for execution within computing device 200. For example, processors 240 may be capable of processing instructions stored in one or more storage devices 248.

Computing device 200 may also include a plurality of pressure sensors 204 as one or more input components 244. As described with respect to FIG. 1, sensors 204 may be capable of receiving touch input from a user and may include electrical devices such as capacitive sensors or resistive sensors, or may include mechanical devices such as switches or pressure plates. The ability to sense touch input may also be employed to receive touch input from a user.

One or more input components 244, in some embodiments, are configured to receive user input from a user through tactile, audio, or video feedback. Examples of input components 244 include a touch-sensitive and/or a presence-sensitive screen, a touch-pad, a mouse, a keyboard, a voice responsive system, or any other type of device for detecting a command from a user.

One or more output components 246 may also be included in computing device 200. Output components 246, in various instances, are configured to provide output to a user using tactile, audio, or video stimuli. Examples of output components 246 may include a touch-sensitive and/or presence-sensitive screen, a sound card, a video graphics adapter card, or any other type of device for converting a signal into an appropriate form understandable to humans or machines. Additional examples of output components 246 may include a speaker, a cathode ray tube (CRT) monitor, a liquid crystal display (LCD), or any other type of device that can generate intelligible output to a user. In some examples, such as those where output components 246 include a touch-sensitive or presence-sensitive screen, one or more of output components 246 may also function as an input device (e.g., one of input components 244).

As shown in FIG. 2, computing device 200 includes a presence-sensitive display 202. Presence-sensitive display 202 of computing device 200 may function as an input device for computing device 200 (e.g., presence-sensitive input component 222), as well as an output device (e.g., display component 220). Presence-sensitive display 202 may be implemented using various technologies. For instance, display component 220 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing device 200. Display component 220 may present output to a user, for instance at a presence-sensitive display. Display component 220 may present the output as a graphical user interface (e.g., user interface 14), which may be associated with functionality provided by computing device 200. For example, display component 220 may present various user interfaces of components of a computing platform, operating system, applications, or services executing at or accessible by computing device 200 (e.g., an electronic message application, an Internet browser application, a mobile operating system, etc.). A user may interact with a respective user interface to cause computing device 200 to perform operations relating to a function.

Presence-sensitive display 202 of computing device 200 may include presence-sensitive input component 222 that may receive tactile input from a user of computing device 200. Presence-sensitive input component 222 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Presence-sensitive input component 222 may receive indications of the tactile input by detecting one or more gestures from a user of computing device 200 (e.g., the user touching or pointing to one or more locations of presence-sensitive input component 222 with a finger or a stylus pen).

In some instances, at least a portion of presence-sensitive display 202 may overlap two or more sides of a housing of computing device 200. In such instances, at least one pressure sensor of sensors 204 may be included within the portion of presence-sensitive display 202 that at least partially overlaps the two or more sides of the housing of computing device 200. This overlapping portion of presence-sensitive display 202 may detect indications of user inputs using the at least one pressure sensor of sensors 204 included in the overlapping portion of presence-sensitive display 202, such as squeezing gestures or twisting gestures.

For example, rather than presence-sensitive display 202 being positioned only on a front face of computing device 200 and being completely framed by a portion of the housing of computing device 200, presence-sensitive display 202 may instead laterally extend over to at least a portion of the side of the housing of computing device 200, either on one end or both ends. The portion of presence-sensitive display 202 that extends to the side of the housing of computing device 200 may receive inputs in a manner similar to the portion of presence-sensitive display 202 that remains on the front face of computing device 200. In some instances, the portion of presence-sensitive display 202 that extends to the side of the housing of computing device 200 may detect holding gestures (e.g., squeezing and twisting gestures) in accordance with the techniques described herein.

Throughout the disclosure, examples are provided where the sensors described (e.g., sensors 204) are additional sensors embedded in a housing of the computing device (e.g., computing device 200). This description is provided in order to more clearly describe the functions and techniques of the disclosure. However, in some examples, computing device 200 may not include sensors 204, and the functionality of sensors 204 may be included in presence-sensitive display 202. As such, determinations of a holding gesture, squeezing gestures, hold gestures, twisting gestures, or any other determinations made based on the data produced by sensors 204 may instead be based on data produced by presence-sensitive display 202. In other words, presence-sensitive display 202 may sense pressure and touch inputs, and UI module 210 may determine a holding gesture based on the data received from presence-sensitive display 202.

In the example of FIG. 2, computing device 200 includes one or more communication units 242. One or more communication units 242 of computing device 100 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more storage devices 248, in one example, are configured to store information within computing device 200 during operation. Storage devices 248, in some examples, are described as a computer-readable storage medium. In some examples, storage devices 248 are a temporary memory, meaning that a primary purpose of storage devices 248 is not long-term storage. Storage devices 248, in some examples, are described as a volatile memory, meaning that storage devices 248 do not maintain stored contents when the computer is turned off. Examples of volatile memories include random access memories (RAM), dynamic random access memories (DRAM), static random access memories (SRAM), and other forms of volatile memories known in the art. In some examples, storage devices 248 are used to store program instructions for execution by one or more processors 240. Storage devices 248, in one example, are used by software or applications running on computing device 200 (e.g., interface manager 8) to temporarily store information during program execution.

Storage devices 248, in some examples, may be configured to store larger amounts of information. Storage devices 248 may further be configured for long-term storage of information. In some examples, storage devices 248 include non-volatile storage elements. Examples of such non-volatile storage elements include magnetic hard discs, optical discs, floppy discs, flash memories, or forms of electrically programmable memories (EPROM) or electrically erasable and programmable memories (EEPROM).

Operating system 214 may control one or more functionalities of computing device 200 and/or components thereof. For example, operating system 214 may interact with application modules 212, and may facilitate one or more interactions between application modules 212 and processors 240, storage devices 248, input components 244, and output components 246. Operating system 214 may interact with or be otherwise coupled to application modules 212, UI module 210 and components thereof. As shown in FIG. 2, operating system 214 and UI module 210 may be stored in storage devices 248, and may be operable by processors 240 to perform various tasks during execution.

Any applications or modules implemented within or executed by computing device 200 (e.g., application modules 212, operating system 214, UI module 210, or input module 224) may be implemented or contained within, operable by, executed by, and/or be operatively coupled to sensors 204, output components 246, processors 240, input components 244, network interface 26, and/or storage devices 248. During implementation or execution by processors 240, operating system 214 may provide information regarding one or more touch inputs from sensors 204 to UI module 210 (e.g., via communication channels 250). Operating system 214 may also be operable to provide information regarding user input from presence-sensitive display 202 and sensors 204 to UI module 210.

UI module 210 may initially execute both operating system 214 and application module 212. In the example of FIG. 2, application module 212 may be associated with an internet browser application. For instance, UI module 210 may begin executing application module 212 after receiving an indication of user input selecting the internet browser application associated with application module 212. While executing application module 212, UI module 210 may output a graphical user interface for the internet browser application associated with application module 212 for display on display component 220. However, UI module 210 may continue executing operating system 214 even while executing application module 212 and outputting the graphical user interface for the internet browser application associated with application module 212 for display on display component 220.

In accordance with the techniques of this disclosure, input module 224 of computing device 200 may receive an indication of a first user input detected by sensors 204. For instance, a user may be gripping computing device 200 such that the user's hand is applying some level of pressure to computing device 200 at locations corresponding to one or more of sensors 204. Input module 224 may receive an indication of the pressure detected by the one or more of sensors 204, such as a current amplitude of the pressure or a change in the amplitude of the pressure resulting from the user applying a tighter or a looser grip to computing device 200. In other words, input module 224 may determine a holding gesture indicative of a way a user of computing device 200 is holding computing device 200. In some instances, the holding gesture may simply be a normal holding gesture, or the indication of the first user input may be the user gripping computing device 200 in the typical way that a user holds computing device 200, such as with a relatively constant amount of pressure applied to computing device 200.

In other instances, holding gesture may be a squeezing gesture or a twisting gesture, generally characterized by a sharp increase in the amount of pressure applied to computing device 200. A squeezing gesture may be characterized by sensors on one edge of computing device 200 detecting a sharp increase in pressure exerted towards a directly opposite edge of computing device 200, and sensors on the directly opposite edge of computing device 200 detecting a sharp increase in pressure exerted towards the one edge of computing device 200. For instance, during a squeezing gesture, a subset of sensors 204 on a left edge of computing device 200 may detect a sharp increase in pressure exerted inwards towards a right edge of computing device 200, and a subset of sensors 204 on the right edge of computing device 200 may detect a sharp increase in pressure exerted inwards towards the left edge of computing device 200. In another instance, a subset of sensors 204 on a front face of computing device 200 may detect a sharp increase in pressure exerted inwards towards a back face of computing device 200, and a subset of sensors 204 on the back face of computing device 200 may detect a sharp increase in pressure exerted inwards towards the front face of computing device 200.

A twisting gesture may be characterized by similar opposing pressures, but the specific sensors detecting the pressures are offset from one another. For instance, when receiving a twisting gesture, a subset of at least four sensors of sensors 204 may detect a sharp increase in pressure, with the four sensors forming corners of a quadrilateral shape on computing device 200. For the twisting gesture, sensors on opposite corners of the formed quadrilateral shape detect pressures exerted in the same direction, and sensors on lateral corners of the formed quadrilateral shape detect pressures exerted in the opposite direction. For instance, a sensor located on the upper half of the right edge of computing device 200 and a sensor located on the lower half of the left edge of computing device 200 may each detect a sharp increase of pressure downward, and a sensor located on the upper half of the left edge of computing device 200 and a sensor located on the lower half of the right edge of computing device 200 may each detect a sharp increase of pressure upward. These offset, opposite pressures create a twisting motion on computing device 200.

Input module 224 may further receive an indication of a second user input that is detected by presence-sensitive display 202 of computing device 200. For instance, presence-sensitive display 202, while outputting the graphical user interface for the internet browser application associated with application module 212 for display at presence-sensitive display 202, may detect an indication of a second user input, such as a tap input on presence-sensitive input component 222 or a gesture on presence-sensitive input component 222. Input module 224 may receive this indication of the second user input detected by presence-sensitive input component 222.

Input module 224 may determine, based on the indication of the first user input, whether the second user input is associated with application module 212 executing at computing device 200 or operating system 214 executing at computing device 200. As noted above, although UI module 210 may be outputting a graphical user interface for the application associated with application module 212 for display at presence-sensitive display 202, UI module 210 may be executing both application module 212 and operating system 214. As such, based on the indication of first user input, UI module 210 may determine whether the second user input is associated with application module 212 or operating system 214.

In determining whether the second user input is associated with application module 212 or operating system 214, input module 224 may analyze various characteristics of the indication of first user input. For instance, input module 224 may determine a pressure measurement detected by sensors 204 in response to receiving the indication of the first user input. Input module 224 may also determine a change in the pressure measurement from a predetermined amount of time before the pressure was measured in response to receiving the indication of the first user input as compared to the measured pressure. Input module 224 may further determine whether the pressure characteristics of the indication of the first user input may be defined as one of a squeezing gesture or a twisting gesture, as described above. Finally, input module 224 may determine whether a current pressure level (i.e., at the time of receiving the indication of the second user input) matches or is within a certain percentage of the pressure measured in response to receiving the indication of the first user input or whether an amount of time less than a predetermined amount of time has passed since measuring the pressure in response to receiving the indication of the first user input.

If input module 224 determines that either the measured pressure is below a certain threshold, that the change in the pressure measurement is not a sharp change (e.g., the rate at which the pressure changes is below a threshold rate), the indication of the first user input is not a squeezing gesture or a twisting gesture, or that a current pressure is not within a certain percentage of the measure pressure and has not been within the certain percentage for an amount of time greater than the predetermined amount of time, input module 224 may determine that the second user input is associated with application module 212. Conversely, if input module 224 determines that the measured pressure is above the certain threshold, that the change in the pressure measurement is a sharp change (e.g., the rate at which the pressure changes is greater than a threshold rate), the indication of the first user input is one of a squeezing gesture or a twisting gesture, that a current pressure is still within a certain percentage of the measure pressure, and that the first user input terminated within the predetermined amount of time before receiving the indication of the second user input, input module 224 may determine that the second user input is associated with operating system 214.

In response to determining that the second user input is associated with application module 212, input module 224 may provide the indication of the second user input to application module 212. Application module 212 may then determine an application-level action to perform based on the indication of the second user input and perform the application-level action. Examples of an application-level action include selecting an element within the graphical user interface, traversing a link, activation of an element within the graphical user interface, reposition a cursor within the graphical user interface, scroll through the graphical user interface, zoom in or out on the content of the graphical user interface, panning through content of the graphical user interface, turning a page within the application, or performing an application-level operation within the internet browsing application associated with application module 212.

In other instances, in response to determining that the second user input is associated with operating system 214, input module 224 may provide the indication of the second user input to operating system 214. Operating system 214 may then determine a system-level action to perform based on the indication of the second user input and perform the system-level action. Examples of the system-level action include a copy content operation, a paste content operation, a screenshot operation, identifying an object at a location of the second user input, minimizing a window shown in the graphical user interface, swapping windows within the graphical user interface, terminating an active application, swapping an active application operation, or performing a system-level operation using operating system 214.

In some examples, either once input module determines that the holding gesture is one of a squeezing gesture or a twisting gesture or determines that the second user input is associated with operating system 214, UI module 210 may visually alter an appearance of a graphical user interface output by presence-sensitive display 202 indicating that the second user input will be provided or is being provided to operating system 214. For instance, in the example of FIG. 2, the graphical user interface being output on display component 220 is a graphical user interface associated with the internet browsing application for application module 212. If input module 224 determines that the holding gesture is one of a squeezing gesture or a twisting gesture or determines that the indication of the second user input is associated with operating system 214, UI module 210 may visually alter the graphical user interface of the internet browsing application by changing, for at least one graphical element included in the graphical user interface, one or more of a color, hue, transparency, luminescence, or brightness. This may be a visual indicator to the user that computing device 200 is configured to receive a system-level input or that a previously received user input is being treated as a system-level input.

In this manner, rather than entering a complicated sequence of inputs or attempting to simultaneously initiate multiple inputs, a user may easily be able to switch between providing application-level inputs and system-level inputs by squeezing or twisting computing device 200. By utilizing the squeezing and/or twisting gesture as the determinant for the input being application-level or system-level, computing device 200 may receive fewer overall inputs before performing application-level and system-level actions, thereby increasing the battery efficiency and processing speed of computing device 200.

Figure 3:
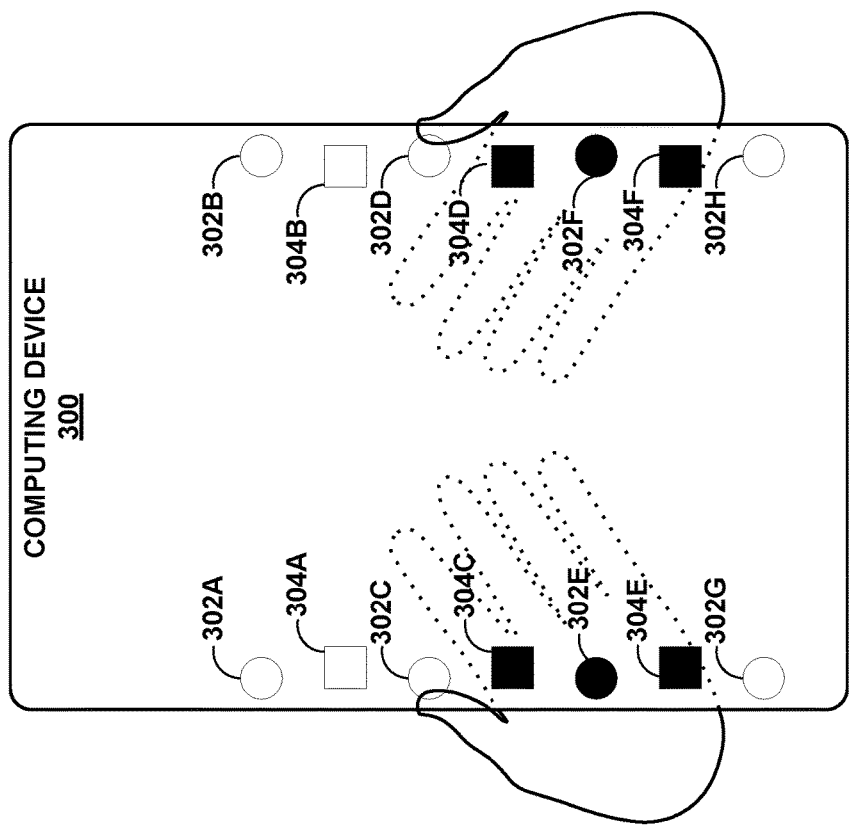
FIG. 3 is conceptual diagram illustrating another example of a computing device that uses inputs detected by pressure sensors to route user inputs to an application or an operating system executing at the computing device, in accordance with one or more aspects of the present disclosure.

FIG. 3 is conceptual diagram illustrating another example of a computing device that uses inputs detected by pressure sensors to route user inputs to an application or an operating system executing at the computing device, in accordance with one or more aspects of the present disclosure. FIG. 3 illustrates only one particular example of computing device 300, and many other example embodiments of computing device 300 may be used in various instances. Computing device 300 may be configured to perform techniques similar to those described with respect to computing device 100 of FIG. 1 and computing device 200 of FIG. 2.

Sensors 302A-302H (collectively, "sensors 302") and sensors 304A-304F (collectively, "sensors 304") may be capable of receiving touch input from a user. Sensors 302 and 304 may include electrical devices such as capacitive sensors or resistive sensors, or may include mechanical devices such as switches or pressure plates. In one example, sensors 302 and 304 may include a plurality of simple capacitance sensors able to determine a change in the capacitance of a material. Electrical hardware attached to each one of the simple capacitance sensors may monitor the respective simple capacitance sensors for a change in capacitance. A change in capacitance may be determined by the attached electrical hardware and an indication may be output by the pressure sensor. Other known sensor techniques providing the ability to sense touch input may also be employed to receive touch input from a user.

Sensors 302 and 304 may be touch or pressure sensors. Sensors 302 and 304 may be located in or on a housing of computing device 300. For example, one or more sensors 302 and 304 may be located such that, when a user interacts with computing device 300 (e.g., by holding computing device 100), sensors 302 and 304 receive touch or pressure inputs at certain ones of sensors 302 and 304. Sensors 302 and 304 may provide the received touch inputs to computing device 300.

Sensors 302 and sensors 304 may be located in different portions of the housing of computing device 300. For instance, one or more portions of a presence-sensitive display may overlap one or more sides of the housing of computing device 300. In such instances, sensors 302 may be located underneath the presence-sensitive display in the portions that overlap the one or more sides of the housing of computing device 300, and sensors 304 may be located in or on a portion of the housing that is not overlapped by the presence-sensitive display. In other instances, sensors 302 may be located in a side portion of the housing of computing device 300, and sensors 304 may be located in a back portion of the housing of computing device 300. Other configurations could include any of sensors 302 and sensors 304 being located in a front portion of the housing of computing device 300, a bottom portion of the housing of computing device 300, a top portion of the housing of computing device 300, or any other location in or on the housing of computing device 300 where touch or pressure inputs may reasonably be sensed.

If computing device 300 were to determine that user inputs are associated with the operating system by determining the holding gesture to be a squeezing gesture, computing device 300 may characterize such a squeezing gesture by having sensors on one edge of computing device 300 (e.g., sensors 304C, 302E, and 304E) detecting a sharp increase in pressure exerted towards a directly opposite edge of computing device 300, and sensors on the directly opposite edge of computing device 300 (e.g., sensors 304D, 302F, and 304F) detecting a sharp increase in pressure exerted towards the one edge of computing device 300. For instance, during a squeezing gesture, sensor 304C may detect a sharp increase in pressure exerted towards sensor 304D, sensor 302E may detect a sharp increase in pressure exerted towards sensor 302F, sensor 304E may detect a sharp increase in pressure exerted towards sensor 304F, sensor 304D may detect a sharp increase in pressure exerted towards sensor 304C, sensor 302F may detect a sharp increase in pressure exerted towards sensor 302E, and sensor 304F may detect a sharp increase in pressure exerted towards sensor 304E. This combination of exerted pressures may indicate the squeezing gesture.

In the example of FIG. 1, computing device 100 is described as a smartphone. In such smaller devices, the holding gesture that activates the routing of user inputs to the operating system may be a squeezing gesture, as it may be less strenuous on the user to squeeze a smaller object than it is to twist the smaller object. A smaller device may also be held with one hand, and it may be simpler for the user to squeeze the smaller device with a single hand than to twist the smaller device with a single hand. Conversely, in the example of FIG. 3, computing device 300 may be a larger computing device, such as a tablet computer. It may be more strenuous to squeeze larger computing device 300 than it is to twist larger computing device 300, and a twisting gesture may be simpler for a user to execute using two hands than a squeezing gesture. As such, computing device 300 may determine whether the holding gesture is a twisting gesture in determining whether a second user input is associated with an application executing on computing device 300 or an operating system executing on computing device 300.

A twisting gesture may be characterized by similar opposing pressures, but the specific sensors detecting the pressures are offset from one another. For instance, when receiving a twisting gesture, sensors 304C-304F and 302E-302F may each detect a sharp increase in pressure, with sensors 304C-304F forming corners of a quadrilateral shape on computing device 300. For the twisting gesture, sensors on opposite corners of the formed quadrilateral shape (e.g., sensors 304C and 304F) detect pressures exerted in the same direction, and sensors on lateral corners of the formed quadrilateral shape (e.g., sensors 304C and 304E) detect pressures exerted in the opposite direction. For instance, sensor 304C and sensor 304F may each detect a sharp increase of pressure downward, and sensor 304D and sensor 304E may each detect a sharp increase of pressure upward. These offset, opposite pressures create a twisting motion on computing device 300.

Figure 4:
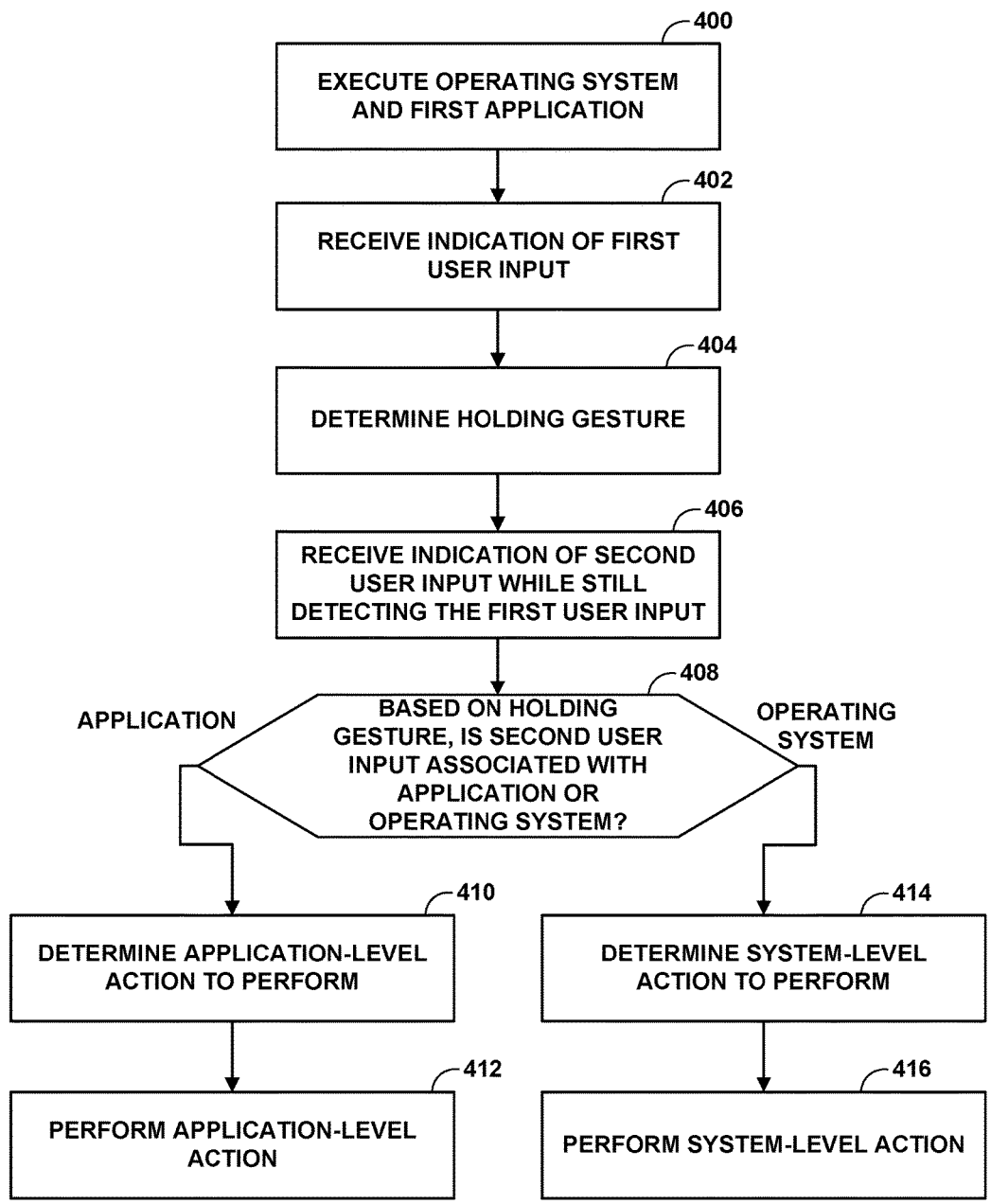
FIG. 4 is a flow diagram illustrating an example process that may be used to route user inputs to an application or an operating system based on other user inputs detected by pressure sensors, in accordance with one or more aspects of the present disclosure.

FIG. 4 is a flow diagram illustrating an example process that may be used to route user inputs to an application or an operating system based on other user inputs detected by pressure sensors, in accordance with one or more aspects of the present disclosure. For purposes of illustration only, the example method illustrated in FIG. 4 is described below within the context of computing device 100 of FIG. 1. The example process described below may be performed by computing device 100 shown in FIG. 1, computing device 200 shown in FIG. 2, or any other configuration of computing device that may perform the techniques described herein.

In accordance with the techniques of this disclosure, computing device 100 may initially execute both operating system 114 and application module 112 (400). Computing device 100 may receive an indication of a first user input detected by sensors 104 and 106 within computing device 100 (402). For instance, a user may be gripping computing device 100 such that the user's hand is applying some level of pressure to computing device 100 at locations corresponding to one or more of sensors 104 and 106. Computing device 100 may receive an indication of the pressure detected by the one or more of sensors 104 and 106, such as a current amplitude of the pressure or a change in the amplitude of the pressure resulting from the user applying a tighter or a looser grip to computing device 100.

Computing device 100 may determine a holding gesture indicative of a way a user of computing device 100 is holding computing device 100 (404). In some instances, the holding gesture may simply be a normal holding gesture, or the indication of the first user input may be the user gripping computing device 100 in the typical way that a user holds computing device 100, such as with a relatively constant amount of pressure applied to computing device 100. In other instances, holding gesture may be a squeezing gesture or a twisting gesture, generally characterized by a sharp increase in the amount of pressure applied to computing device 100.

Computing device 100 may further receive an indication of a second user input that is detected by presence-sensitive display 102 of computing device 100 (406). For instance, presence-sensitive display 102, while outputting the graphical user interface for the application associated with application module 112 for display at presence-sensitive display 102, may detect an indication of a second user input, such as a tap input on presence-sensitive display 102 or a gesture on presence-sensitive display 102. Computing device 100 may receive this indication of the second user input detected by presence-sensitive display 102.

Computing device 100 may determine, based on the holding gesture, whether the second user input is associated with application module 112 executing at computing device 100 or operating system 114 executing at computing device 100 (408). As noted above, although computing device 100 may be outputting a graphical user interface for the application associated with application module 112 for display at presence-sensitive display 102, computing device 100 may be executing both application module 112 and operating system 114. As such, based on the holding gesture being either the normal hold gesture or one of the squeezing gesture or the twisting gesture, computing device 100 may determine whether the second user input is associated with application module 112 or operating system 114.

If computing device 100 determines that the holding gesture is a normal hold gesture, computing device 100 may determine that the second user input is associated with application module 112 and provide the indication of the second user input to application module 112 (APPLICATION branch of 408). Application module 112 may then determine an application-level action to perform based on the indication of the second user input (410) and perform the application-level action (412). Examples of an application-level action include selecting an element within the graphical user interface, traversing a link, activation of an element within the graphical user interface, reposition a cursor within the graphical user interface, scroll through the graphical user interface, zoom in or out on the content of the graphical user interface, panning through content of the graphical user interface, turning a page within the application, or performing an application-level operation within the internet browsing application associated with application module 112.

If, however, computing device 100 determines that the holding gesture is one of the squeeze gesture or the twist gesture, computing device 100 may determine that the second user input is associated with operating system 114 and provide the indication of the second user input to operating system 114 (OPERATING SYSTEM branch of 408). Operating system 114 may then determine a system-level action to perform based on the indication of the second user input (414) and perform the system-level action (416). Examples of the system-level action include a copy content operation, a paste content operation, a screenshot operation, identifying an object at a location of the second user input, minimizing a window shown in the graphical user interface, swapping windows within the graphical user interface, terminating an active application, swapping an active application operation, or performing a system-level operation using operating system 114.

Example 1

A computing device comprising: a housing having a plurality of sides; a plurality of pressure sensors, wherein respective portions of the plurality of pressure sensors are positioned on each side of at least two sides of the plurality of sides of the housing; a presence-sensitive display; a memory that stores an operating system and a plurality of applications; and one or more processors configured to: execute the operating system and a first application from the plurality of applications; receive, from one or more pressure sensors from the plurality of pressure sensors, an indication of a first user input; determine, based on the indication of the first user input, a holding gesture indicative of a way a user of the computing device is holding the computing device; while the one or more pressure sensors continue to detect the first user input, receive, from the presence-sensitive display, an indication of a second user input, wherein the second user input is detected by the presence-sensitive display; determine, based on the holding gesture, whether the second user input is associated with the operating system or the first application; and perform a system-level action in response to the determining that the second user input is associated with the operating system.

Example 2

The computing device of example 1, wherein the one or more processors are further configured to: receive, from the one or more pressure sensors, an indication of a termination of the first user input; determine, based on the indication of the termination of the first user input, a second holding gesture; while the one or more pressure sensors no longer detect the first user input, receive, from the presence-sensitive display, an indication of a third user input, wherein the third user input is detected by the presence sensitive display; determine, based on the second holding gesture, whether the third user input is associated with the operating system or the first application; and perform an application-level action in response to determining that the third user input is associated with the first application.

Example 3

The computing device of example 2, wherein the application-level action includes one or more of a selection, activation, cursor reposition, scroll, zoom, pan, or page turn.

Example 4

The computing device of any of examples 1-3, wherein the system-level action is one or more of a copy operation, a paste operation, a screenshot operation, identify an object at a location of the second user input, a minimize window operation, a swap windows operation, a terminate active application operation, or a swap active application operation.

Example 5

The computing device of any of examples 1-4, wherein the holding gesture is a squeeze gesture.

Example 6

The computing device of any of examples 1-5, wherein the holding gesture is a twisting gesture.

Example 7

The computing device of any of examples 1-6, where the one or more processors are configured to: responsive to determining that the second user input is associated with the operating system, visually alter an appearance of a graphical user interface output by the presence-sensitive display indicating that the second user input is being provided to the operating system.

Example 8

The computing device of example 7, wherein the one or more processors is configured to visually alter the graphical user interface by at least being configured to change, for at least one graphical element included in the graphical user interface, one or more of a color, hue, transparency, luminescence, or brightness.

Example 9

The computing device of any of examples 1-8, wherein: at least a portion of the presence-sensitive display at least partially overlaps two or more sides of the housing; at least one pressure sensor from the plurality of pressure sensors is included within the portion of the presence-sensitive display that at least partially overlaps the two or more sides of the housing; and the first user input is detected using the at least one pressure sensor that is included within the portion of the presence-sensitive display that at least partially overlaps the two or more sides of the housing.

Example 10

A method comprising: receiving, by one or more processors of a computing device, an indication of a first user input that is detected by one or more pressure sensors of the computing device, wherein the pressure sensors are positioned along two or more side of a housing of the computing device; receiving, by the one or more processors, an indication of a second user input, wherein the second user input is detected by a presence-sensitive display of the computing device; determining, by the one or more processors, based on the indication of the first user input, whether the second user input is associated with an application executing at the computing device or an operating system executing at the computing device; and responsive to determining that the second user input is associated with the operating system, performing a system-level action.

Example 11

The method of example 10, further comprising: receiving, by the one or more processors, an indication of a termination of the first user input that is detected by the one or more pressure sensors of the computing device; receiving, by the one or more processors, an indication of a third user input, wherein the third user input is detected by the presence-sensitive display; determining, by the one or more processors, based on the indication of the termination of the first user input, whether the third user input is associated with the application executing at the computing device or the operating system executing at the computing device; and responsive to determining that the third user input is associated with the application, performing an application-level action.

Example 12

The method of any of examples 10-11, wherein the system-level action is one or more of a copy operation, a paste operation, a screenshot operation, identify an object at a location of the second user input, a minimize window operation, a swap windows operation, a terminate active application operation, or a swap active application operation.

Example 13

The method of any of examples 10-12, further comprising: responsive to determining that the second user input is associated with the operating system, visually altering an appearance of a graphical user interface output by the presence-sensitive display to indicate that the second user input is being provided to the operating system.

Example 14

The method of any of examples 10-13, wherein determining, by the one or more processors, based on the indication of the first user input, whether the second user input is associated with the application executing at the computing device or the operating system executing at the computing device comprises: determining, by the one or more processors and based on the indication of the first user input, a holding gesture; and determining, by the one or more processors and based on the holding gesture, whether the second user input is associated with the application or the operating system.

Example 15

The method of any of examples 10-14, wherein the holding gesture is one or more of a squeeze gesture or a twist gesture.

Example 16

A non-transitory computer-readable storage medium encoded with instructions that, when executed, cause one or more processors of a computing device to: receive an indication of a first user input that is detected by one or more pressure sensors of the computing device, wherein the pressure sensors are positioned along two or more side of a housing of the computing device; receive an indication of a second user input, wherein the second user input is detected by a presence-sensitive display of the computing device; determine, based on the indication of the first user input, whether the second user input is associated with an application executing at the computing device or an operating system executing at the computing device; and responsive to determining that the second user input is associated with the operating system, perform a system-level action.

Example 17

The non-transitory computer-readable storage medium of example 16, wherein the instructions, when executed, further cause the one or more processors to: receive an indication of a termination of the first user input that is detected by the one or more pressure sensors of the computing device, wherein the pressure sensors are positioned along two or more side of a housing of the computing device; receive an indication of a third user input, wherein the third user input is detected by a presence-sensitive display of the computing device; determine, based on the indication of the first user input, whether the third user input is associated with the application executing at the computing device or the operating system executing at the computing device; and responsive to determining that the second user input is associated with the operating system, provide the indication of the second user input to the operating system.

Example 18

The non-transitory computer-readable storage medium of any of examples 16-17, wherein the system-level action is one or more of a copy operation, a paste operation, a screenshot operation, identify an object at a location of the second user input, a minimize window operation, a swap windows operation, a terminate active application operation, or a swap active application operation.

Example 19

The non-transitory computer-readable storage medium of any of examples 16-18, wherein the instructions, when executed, further cause the one or more processors to: responsive to determining that the second user input is associated with the operating system, visually alter an appearance of a graphical user interface output by the presence-sensitive display to indicate that the second user input is being provided to the operating system.

Example 20

The non-transitory computer-readable storage medium of any of examples 16-19, wherein the instructions that cause the one or more processors to determine, based on the indication of the first user input, whether the second user input is associated with the application executing at the computing device or the operating system executing at the computing device comprise instructions that, when executed, further cause the one or more processors to: determine, based on the indication of the first user input, a holding gesture; and determine, based on the holding gesture, whether the second user input is associated with the application or the operating system.

Example 21

A computing device configured to perform any of the methods of examples 10-15.

Example 22

A computing device comprising means for performing any of the methods of examples 10-15.

Example 23

A computer-readable storage medium encoded with instructions for causing one or more programmable processors to perform any of the methods of examples 10-15.

Example 24

A method comprising the steps performed by the computing device of any of examples 1-10.

Example 25

A computing device comprising means for performing any of the steps performed by the computing device of any of examples 1-10.

Example 26

A computer-readable storage medium encoded with instructions for causing one or more programmable processors to perform any of the steps performed by the computing device of any of examples 1-10.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer readable data storage medium comprising instructions that, when executed, cause one or more processors to perform one or more of the methods described above. For example, the computer-readable data storage medium may store such instructions for execution by a processor. Any combination of one or more computer-readable medium(s) may be utilized.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Various embodiments have been described. These and other embodiments are within the scope of the following claims.

What is claimed is:

1. A computing device comprising:
a housing having a plurality of sides;
a plurality of pressure sensors, wherein respective portions of the plurality of pressure sensors are positioned on each side of at least two sides of the plurality of sides of the housing;
a presence-sensitive display;
a memory that stores an operating system and a plurality of applications; and
one or more processors configured to:
  execute the operating system and a first application from the plurality of applications;
  receive, from one or more pressure sensors from the plurality of pressure sensors, an indication of a first user input detected by the one or more pressure sensors;
  determine, based on the indication of the first user input, a holding gesture indicative of a way a user of the computing device is holding the computing device;
  while the one or more pressure sensors continue to detect the first user input, receive, from the presence-sensitive display, an indication of a second user input, wherein the second user input is detected by the presence-sensitive display;
  determine, based on the holding gesture, whether the second user input is associated with the operating system or the first application; and
  perform a system-level action in response to determining that the second user input is associated with the operating system.

2. The computing device of claim 1, wherein the one or more processors are further configured to:
receive, from the one or more pressure sensors, an indication of a termination of the first user input;
determine, based on the indication of the termination of the first user input, a second holding gesture;
while the one or more pressure sensors no longer detect the first user input, receive, from the presence-sensitive display, an indication of a third user input detected by the presence sensitive display;
determine, based on the second holding gesture, whether the third user input is associated with the operating system or the first application; and
perform an application-level action in response to determining that the third user input is associated with the first application.

3. The computing device of claim 2, wherein the application-level action includes one or more of a selection, activation, cursor reposition, scroll, zoom, pan, or page turn.

4. The computing device of claim 1, wherein the system-level action is one or more of a copy operation, a paste operation, a screenshot operation, identify an object at a location of the second user input, a minimize window operation, a swap windows operation, a terminate active application operation, or a swap active application operation.

5. The computing device of claim 1, wherein the holding gesture is a squeeze gesture.

6. The computing device of claim 1, wherein the holding gesture is a twisting gesture.

7. The computing device of claim 1, where the one or more processors are configured to:
responsive to determining that the second user input is associated with the operating system, visually alter an appearance of a graphical user interface output by the presence-sensitive display indicating that the second user input is being provided to the operating system.

8. The computing device of claim 7, wherein the one or more processors is configured to visually alter the graphical user interface by at least being configured to change, for at least one graphical element included in the graphical user interface, one or more of a color, hue, transparency, luminescence, or brightness.

9. The computing device of claim 1, wherein:
at least a portion of the presence-sensitive display at least partially overlaps two or more sides of the housing;
at least one pressure sensor from the plurality of pressure sensors is included within the portion of the presence-sensitive display that at least partially overlaps the two or more sides of the housing; and
the first user input is detected using the at least one pressure sensor that is included within the portion of the presence-sensitive display that at least partially overlaps the two or more sides of the housing.

10. A method comprising:
receiving, by one or more processors of a computing device, an indication of a first user input that is detected by one or more pressure sensors of the computing device, wherein the pressure sensors are positioned along two or more side of a housing of the computing device;
receiving, by the one or more processors, an indication of a second user input, wherein the second user input is detected by a presence-sensitive display of the computing device;
determining, by the one or more processors, based on the indication of the first user input, whether the second user input is associated with an application executing at the computing device or an operating system executing at the computing device; and
responsive to determining that the second user input is associated with the operating system, performing, by the one or more processors, a system-level action.

11. The method of claim 10, further comprising:
receiving, by the one or more processors, an indication of a termination of the first user input that is detected by the one or more pressure sensors of the computing device;
receiving, by the one or more processors, an indication of a third user input, wherein the third user input is detected by the presence-sensitive display;
determining, by the one or more processors, based on the indication of the termination of the first user input, whether the third user input is associated with the application executing at the computing device or the operating system executing at the computing device; and
responsive to determining that the third user input is associated with the application, providing the indication of the third user input to the application.

12. The method of claim 10, wherein the system-level action is one or more of a copy operation, a paste operation, a screenshot operation, identify an object at a location of the second user input, a minimize window operation, a swap windows operation, a terminate active application operation, or a swap active application operation.

13. The method of claim 10, further comprising:
responsive to determining that the second user input is associated with the operating system, visually altering an appearance of a graphical user interface output by the presence-sensitive display to indicate that the second user input is being provided to the operating system.

14. The method of claim 10, wherein determining, by the one or more processors, based on the indication of the first user input, whether the second user input is associated with the application executing at the computing device or the operating system executing at the computing device comprises:
determining, by the one or more processors and based on the indication of the first user input, a holding gesture; and
determining, by the one or more processors and based on the holding gesture, whether the second user input is associated with the application or the operating system.

15. The method of claim 10, wherein the holding gesture is one or more of a squeeze gesture or a twist gesture.

16. A non-transitory computer-readable storage medium encoded with instructions that, when executed, cause one or more processors of a computing device to:
receive an indication of a first user input that is detected by one or more pressure sensors of the computing device, wherein the pressure sensors are positioned along two or more side of a housing of the computing device;
receive an indication of a second user input, wherein the second user input is detected by a presence-sensitive display of the computing device;
determine, based on the indication of the first user input, whether the second user input is associated with an application executing at the computing device or an operating system executing at the computing device; and responsive to determining that the second user input is associated with the operating system, perform a system-level action.

17. The non-transitory computer-readable storage medium of claim 16, wherein the instructions, when executed, further cause the one or more processors to:
receive an indication of a termination of the first user input that is detected by the one or more pressure sensors of the computing device;
receive an indication of a third user input, wherein the third user input is detected by the presence-sensitive display;
determine, based on the indication of the termination of the first user input, whether the third user input is associated with the application executing at the computing device or to the operating system executing at the computing device; and
responsive to determining that the third user input is associated with the application, perform an application-level action.

18. The non-transitory computer-readable storage medium of claim 16, wherein the system-level action is one or more of a copy operation, a paste operation, a screenshot operation, identify an object at a location of the second user input, a minimize window operation, a swap windows operation, a terminate active application operation, or a swap active application operation.

19. The non-transitory computer-readable storage medium of claim 16, wherein the instructions, when executed, further cause the one or more processors to:
responsive to determining that the second user input is associated with the operating system, visually alter an appearance of a graphical user interface output by the presence-sensitive display to indicate that the second user input is being provided to the operating system.

20. The non-transitory computer-readable storage medium of claim 16, wherein the instructions that cause the one or more processors to determine, based on the indication of the first user input, whether the second user input is associated with the application executing at the computing device or to the operating system executing at the computing device comprise instructions that, when executed, further cause the one or more processors to:
determine, based on the indication of the first user input, a holding gesture; and
determine, based on the holding gesture, whether the second user input is associated with the application or the operating system.

\* \* \* \* \*